United States Patent [19]

Cline

[11] Patent Number: 5,031,455
[45] Date of Patent: Jul. 16, 1991

[54] BICYCLE POWER METER

[76] Inventor: David J. Cline, 5471 Sorrento Dr., Long Beach, Calif. 90803

[21] Appl. No.: 403,192

[22] Filed: Sep. 5, 1989

[51] Int. Cl.$^5$ .......................... A61B 5/22; G01L 3/24
[52] U.S. Cl. ................... 73/379; 73/862.28; 73/862.34
[58] Field of Search ................ 73/379, 862.28, 862.33, 73/862.34; 272/73; 301/6 V, 6 WB, 105 B, 105 R; 280/200

[56] References Cited

U.S. PATENT DOCUMENTS

| 925,180 | 6/1909 | Harris . |
| 2,244,621 | 6/1941 | Hurt . |
| 2,346,976 | 4/1944 | Langer et al. . |
| 2,592,796 | 4/1952 | Doussain . |
| 2,616,290 | 11/1952 | Moore . |
| 3,128,622 | 4/1964 | Lebow . |
| 3,295,367 | 1/1967 | Rundell . |
| 3,339,405 | 9/1967 | McDowall . |
| 3,599,482 | 8/1971 | Rundell . |
| 3,823,607 | 7/1974 | Rundell . |
| 3,824,848 | 7/1974 | Parkinson . |
| 4,085,612 | 4/1978 | Rundell . |
| 4,150,566 | 4/1979 | Loebel et al. . |
| 4,186,596 | 2/1980 | Bohringer et al. . |
| 4,345,481 | 8/1982 | Schroyer ........................ 73/862.34 |
| 4,364,277 | 12/1982 | Rundell . |
| 4,423,630 | 1/1984 | Morrison ........................ 73/379 |
| 4,492,906 | 1/1985 | Goto et al. . |
| 4,520,681 | 6/1985 | Moore et al. . |
| 4,811,612 | 3/1989 | Mercat ........................... 73/862.34 |

FOREIGN PATENT DOCUMENTS

| 3150149 | 6/1983 | Fed. Rep. of Germany ........ 73/379 |
| 2617970 | 1/1989 | France ................................ 280/200 |

*Primary Examiner*—Charles A. Ruehl
*Attorney, Agent, or Firm*—Fulwider Patton

[57] ABSTRACT

A bicycle power meter having components which replace the rear axle hub assembly of a conventional chain driven bicycle. Inner and outer hubs are coupled to the usual freewheel chain drive cluster and to the rear wheel, respectively. The hubs are interconnected by a plurality of torsion rods which transmit driving torque form the inner hub to the outer hub. The torsional deflection of the rods is evidenced by a change in the relative angular displacement between a pair of hub disks attached to the hubs, respectively. The rate of rotation of the outer hub disk reflects wheel speed. A sensor head converts the relative angular displacement between the disks, and the rate of rotation of the outer hub disk, into signals which are applied to a processing and display module that calculates and displays horsepower.

17 Claims, 3 Drawing Sheets

FIG. 5
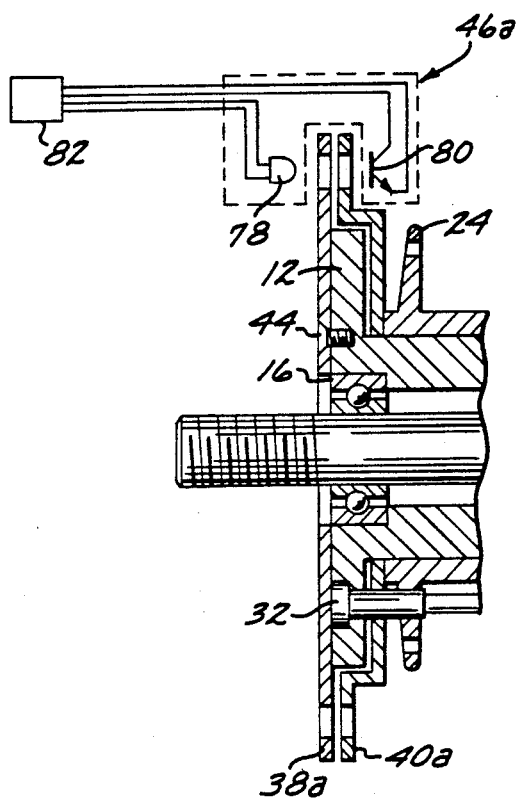
FIG. 6
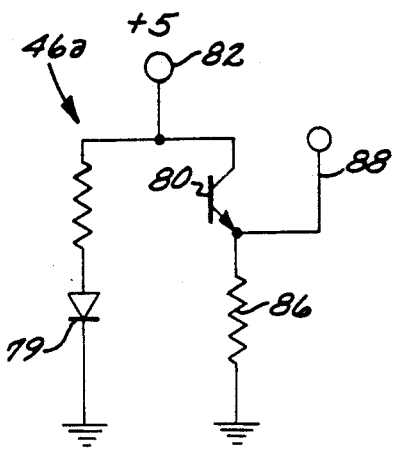
(OUTPUT WITH NO TORQUE APPLIED)
FIG. 7A
(OUTPUT WITH TORQUE APPLIED)
FIG. 7B
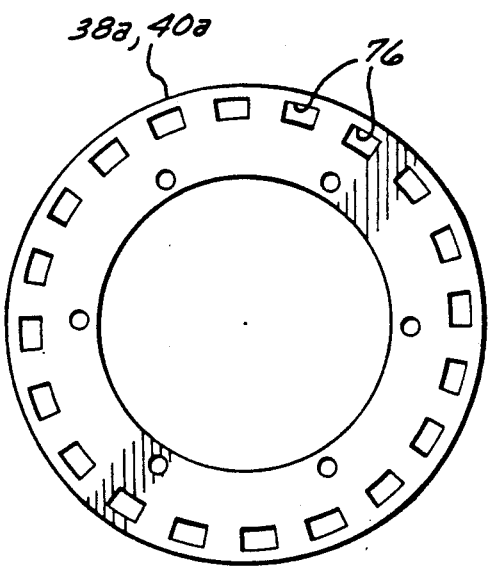
FIG. 8

BICYCLE POWER METER

BACKGROUND OF THE INVENTION

1. Field of the Invention

The present invention relates to a bicycle power meter, and more particularly to a dynamometer to determine rider applied torque, and to calculate and display the horsepower developed.

2. Description of the Prior Art

Bicyclists as a class, and particularly competitive riders, are interested in their level of performance. Numerous devices exist for determining the speed of the bicycle, distance traveled, pulse rate of the rider, etc. However, an easy and precise means for determining the power output of a bicycle rider is not available. Display of the power output in watts or calories would enable a rider to assess his performance under a variety of conditions. It would be an important and continuing indication of the level of performance, unaffected by the rider's subjective perception. A bicyclist approaching the limit of his physical stamina may perceive his level of physical exertion to be greater than it actually is, and an effective power meter would immediately indicate whether or not his perception was correct.

In the case of a bicycle racer participating in a 100 mile race, an increase of only one percent in efficiency will result in a time advantage in excess of two minutes, which is almost a half mile advantage at the speeds common in such a race. A power meter would also enable an expert bicyclist to pace himself more accurately. By accurately measuring rider applied torque, such a power meter can not only calculate developed horsepower, but other related matters as well, such as the efficiency with which the power is applied by the rider to achieve bicycle speed.

Measurement of bicycle driving torque has been accomplished heretofore in a number of ways. Systems utilized strain gauges, which were sometimes associated with the pedals, sometimes with the crank arm, and sometimes with the chain wheel. Other systems measured torque by measuring drive chain tension. For various reason none of these has been particularly successful, some because they were contact systems which undesirably tapped part of the input energy to derive a so-called total power output. Ideally, torque should be measured in a contactless, frictionless indirect fashion.

Noncontact systems are known in the broad field of dynamometers, as represented by U.S. Pat. No. 4,520,681, issued June 4, 1985 to J. D. Moore et al. In that system the torque present in a rotating shaft was determined by sensing the relative angular positions of a pair of disks mounted on the shaft in axially spaced apart relation. In U.S. Pat. No. 2,616,290, issued Nov. 4, 1952 to C. R. Moore, a pair of sine wave generators were connected to the prime mover and to the load, respectively, and coupled together by torsion means. The level of torsion was then represented by the change in phase of the voltages generated by the sine wave generators. In U.S. Pat. No. 3,824,848, issued July 23, 1974 to J. R. Parkinson, a phase displacement torque measuring apparatus utilized a pair of toothed exciter wheels coupled to the shaft in spaced apart relation. The change in their relative angular position on the shaft indicated the torque developed in the shaft.

None of these references suggests any advantage which would be gained by employing a noncontact form of dynamometer in a bicycle, and they particularly lack any hint of how any such dynamometer could be redesigned or modified for use in determining the power output of a bicycle rider.

SUMMARY OF THE INVENTION

According to the present invention, a bicycle power meter is provided which is associated with the rear or drive wheel of the usual chain driven bicycle. The meter comprises a first hub for rotation about the axis of the usual axle which is fixed to the bicycle frame. A second hub is carried by the first hub and includes flanges for mounting the spokes of the bicycle rear wheel. Torsion means are connected between the hubs, and a drive means is coupled to the first hub for applying a driving torque to drive the second hub and consequently the rear wheel. The amount of the torque is evident in a change in the relative angular displacement between the two hubs. A sensor means detects the amount of the angular displacement, and also the rate of rotation of the second hub, and generates signals processed by a processing and display module to calculate and display the power output of the bicycle rider.

In one embodiment of the invention the first hub is an inner hub rotatable on bearings carried by the axle, and the second hub is cylindrical or sleeve shaped to fit over the inner hub. It is rotatable relative to the inner hub through a relatively short circumferential distance or arc of travel. The torsion means comprises a plurality of elongated rods connected at their opposite ends to the inner and outer hubs.

In one embodiment the sensor means includes a pair of toothed disks coupled, respectively, to the inner and outer hubs. The sensor means also includes a sensor head responsive to changes in the respective arrival times of the teeth of the two hubs to generate signals indicative of the angular displacement between the disks. In a second embodiment the disks are provided with circumferentially spaced apertures or windows rather than circumferential teeth, and the sensor head comprises an optical sensor head that straddles the disks. The signal or pulse width of the optical sensor head is relatively wide when the light path is through coincident or aligned windows of the disks, and becomes narrower when the light path is through misaligned windows. Such misalignment results from the angular displacement of the disks that occurs upon the application of torque to one hub relative to the other.

A processing and display module accepts the signals from the particular sensor head and calculates horsepower as a function of the rate of rotation and the relative angular displacement between the disks.

It is theorized that the present apparatus will improve the bicyclist's pedaling efficiency. Because power is applied through a rotating pedal crank, the efficiency of power input is poor at a vertical or zero crank angle when the rider's legs are at the top or bottom of the stroke, and excellent when the advancing pedal is at a horizontal or ninety degree crank angle. The bicycle thus undergoes two acceleration/deceleration cycles for each pedal crank revolution. The torque transmission means of the invention should smooth out such extremes because the loading and unloading of the torsion means will not be instantaneous, as compared to the rigid or unyielding drive interconnection of the prior art.

Other objects and features of the invention will become apparent from consideration of the following description taken in connection with the accompanying drawings.

BRIEF DESCRIPTION OF THE DRAWINGS

FIG. 5 is a partial longitudinal cross sectional view similar to FIG. 2, but illustrating the hub and disk structure and associated sensor head of a second embodiment of the invention, the omitted portion of the hub and disk structure being identical to that shown in FIG. 2;

FIG. 6 is a schematic diagram of the electrical circuit for the sensor head of FIG. 5;

FIGS. 7A and 7B are timing diagrams for the output pulses of the sensor head of FIG. 5 for aligned and non-aligned states the disk windows, respectively; and FIG. 8 is a side elevational view applicable to either disk.

DESCRIPTION OF THE PREFERRED EMBODIMENT

Figure 2:
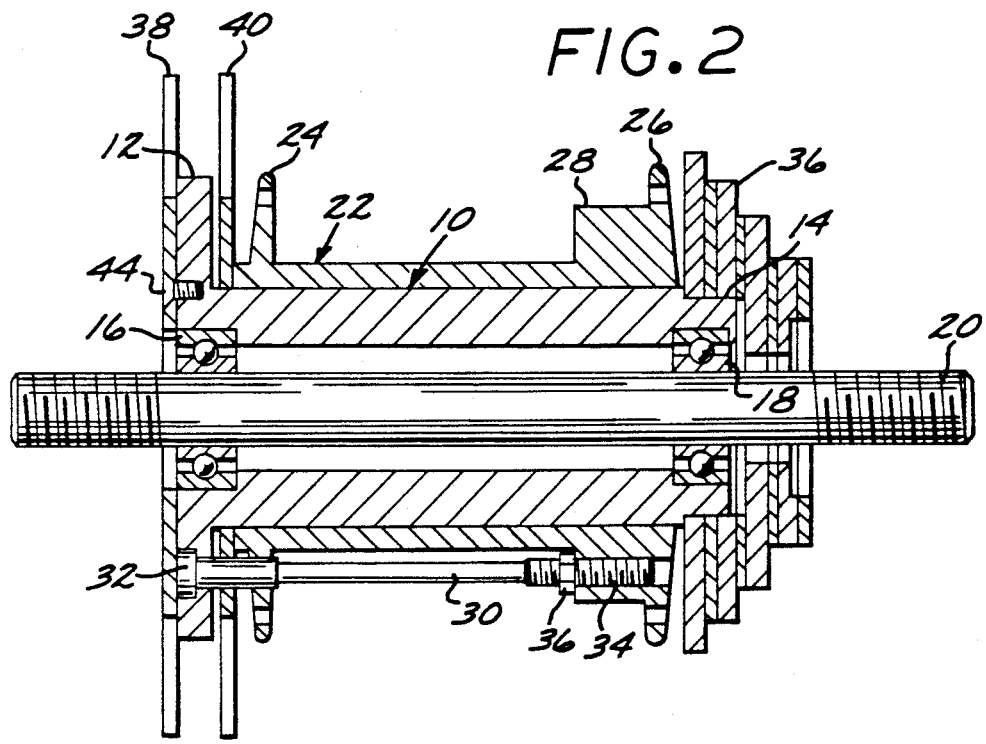
FIG. 2 is a longitudinal cross sectional view of the hub and disk structure.

Referring now to the drawings, and particularly to FIG. 2, there is illustrated a hub and disk structure which replaces the conventional rear hub structure of a bicycle wheel. The conventional gear hub (not shown) includes end flanges having openings adapted to accept the inner ends of the usual plurality of spokes of a rear bicycle wheel.

The conventional hub is removed and replaced by a cylindrical inner hub 10 having a flange 12 at one end and a reduced diameter portion 14 at the other end. The ends of the inner hub 10 include annular bearing seats which receive a pair of ball bearings 16 and 18 fitted to the conventional bicycle rear axle 20 which is fixed to the bicycle frame (not shown). This enables the inner hub 10 to rotate freely about the axis defined by the axle 20.

Another replacement component is a cylindrical outer hub 10 having an inner diameter approximating the outer diameter of the inner hub 10. The outer hub is circumferentially displaceable or rotatable relative to the inner hub 10, but only through a relatively small degree of travel, as will be seen.

The opposite ends of the outer hub 22 include spoke flanges 24 and 26, respectively, having a plurality of equally circumferentially spaced openings adapted to accept and mount the inner ends of a corresponding plurality of conventional spokes (not shown). The associated bicycle wheel (not shown) thus is rotatable with the outer hub 22. Inwardly of the spoke flange 26, the outer hub includes an annular shoulder 28.

A torsion means connected between the hubs 10 and 22 preferably comprises a plurality of equally circumferentially spaced torsion rods 30 (only one of which is illustrated in FIG. 2). Each rod 30 includes an enlarged portion or head 32 at one end and a threaded shank 34 at the opposite end. The heads 32 are received or seated within a corresponding number of circumferentially spaced openings provided in the outer face of the inner hub flange 12. The threaded shank ends 34 are similarly situated within a plurality of equally circumferentially spaced threaded openings provided in the outer hub shoulder 28. Each of the rods 30 is also fixed in position by a lock nut 36 threaded upon the shank 34 and bearing against the inner face of the shoulder 28.

Although the rods 30 are a preferred form of torsion means, any suitable means can be interposed between the hubs 10 and 22 which would be effective to transmit torque between the hubs and thereby impart rotation to the outer hub. It is important primarily that the torsion means have a predetermined spring rate and thereby be displaced in proportion to the level of applied torque so that measurement of the displacement enables the level of applied torque to be determined. The yieldability or flexure of the torsion means provides an added benefit in that the application of torque to the outer hub will be relatively gradual, as compared to the rigid rear hub and bicycle chain drive interconnection of the prior art. In effect, the torsion means loads and unloads to smooth out the uneven application of force by the bicyclist through the pedal crank arms.

The drive means coupled to the inner hub 10 also may take various forms. It could be a chainless gear drive, as used in some bike designs, but preferably it comprises the more conventional freewheel gear cluster 36. The cluster 36 includes a plurality of adjacent gears or toothed sprockets separately engagable by a bicycle chain (not shown) for driving the cluster at a rate of rotation dictated by the particular gear which is engaged, as will be apparent to those skilled in the art.

The cluster 36 is preferably internally threaded for mounting upon the exteriorly threaded reduced diameter portion 14 of the inner hub 10. As force is applied by the bicyclist to the pedal crank (not shown), the bicycle chain rotates the gear cluster 36, which rotates inner hub 10 and, as the torque rods 30 take up the torquing action, the outer hub 22 changes its angular position relative to the inner hub 10, and in proportion to the level of torque applied. As long as the same level of torque is applied, the relative angular position remains constant, with both hubs rotating in unison.

The sensor means which detects the change in relative angular position of the hubs under the influence of the driving torque may take any of various forms, including such contactless, indirect torque measurement devices as optical sensors, capacitive devices or magnetic heads which sense a change in the adjacent magnetic field. The latter type of device is used in the bicycle power meter illustrated in FIG. 1. Thus, the sensor means comprises an inner hub disk 38 and an outer hub disk 40 which are each characterized by a plurality of radially outwardly directed, equally circumferentially spaced slots which define teeth 42.

The inner hub disk 38 is attached to the outer face of the flange 12 by a plurality of machine screws 44 (only one of which is illustrated in FIG. 2) which are received within a corresponding plurality of equally circumferentially spaced countersunk openings in the disk 38, passing into complemental threaded openings provided in the inner hub flange 12.

The other disk 40 is similarly rigidly secured to the outer end of the outer hub 22 adjacent the spoke flange 24. This locates the outer hub disk 40 adjacent the inner face of the flange 12 and in confronting and adjacent relation to the other disk 38. It should be noted, although not seen in the drawings, that both the disk 40 and spoke flange 24 are provided with openings through which the torque rods 30 extend. These openings are arcuately elongated so that the rods 30 are deflectable within a limited range without imparting any movement to the disk 40 or the spoke flange 24.

Figure 1:
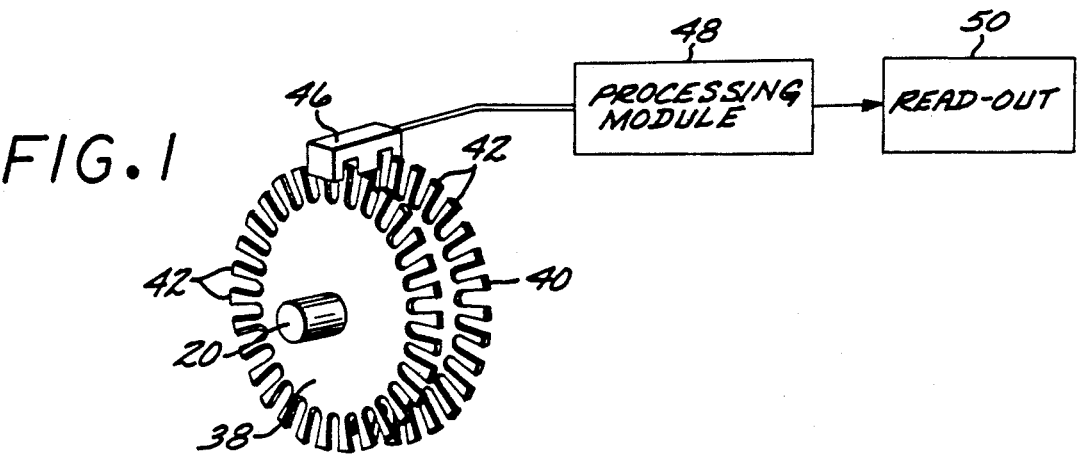
FIG. 1 is a perspective, partially schematic view of a pair of hub disks in association with a sensor head for determining the rate of rotation of one of the disks, and the relative angular displacement between the disks, and also illustrating, the processing module and readout display.

The sensor means which comprises the disks 38 and 40 also includes a fixed magnetic pickup or sensor head 46, as schematically shown in FIG. 1. It is attached to suitable fixed structure of the associated bicycle. The sensor head 46 includes a pair of transducers magnetically coupled to the respective disks. Each transducer has a magnet on one side of the associated disk and a magnetic field detector on the other, both out of actual contact with the disk. Whenever a tooth 42 passes, the magnetic field is interrupted, and a signal is generated.

Figure 3:
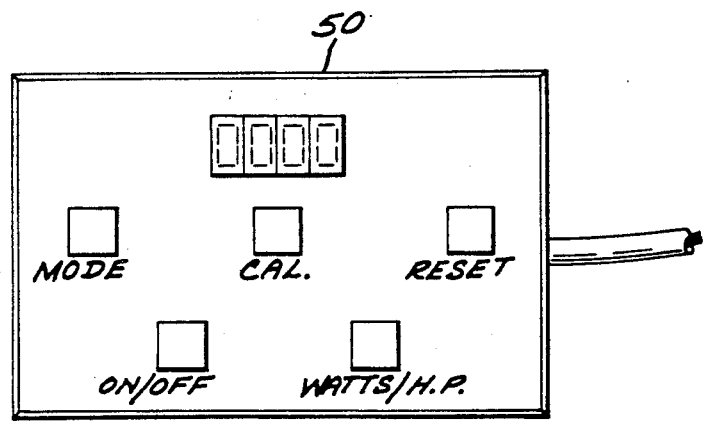
FIG. 3 is a top plan view of a typical readout.

The pair of transducers in the sensor head 46 monitor the exact arrival time of each tooth of each of the disks 38 and 40, and the elapsed time between each succeeding tooth, and generates signals which enable the processing and display module 48 to calculate the rotational speed or RPM of the outer hub 22 and the associated bicycle wheel. In addition, the module compares the signals generated by the sensor head 46 upon passage of the respective teeth of the disks 38 and 40. Although the disks rotate at exactly the same speed, they are angularly displaced relative to one another in proportion to the applied torque. With this information, and utilizing stored data respecting the torsional deformation properties of the torsion rods the module 48 is able to calculate torque, bicycle speed, and horsepower. As the data is continuously updated and stored, it is simultaneously displayed by the readout 50. FIG. 3 illustrates one form of readout which includes typical mode, reset and on-off functions as well as a display of power in watts or calories.

The second embodiment of the invention illustrated in FIGS. 5-8 is substantially similar to the embodiment of FIGS. 1-3 in structure and operation. Therefore, identical parts are assigned identical numerals, and modified parts performing substantially the same function are assigned identical numbers with the subscript "a".

The embodiment of FIGS. 5-8 is characterized by disks 38a and 40a, the disk 38a being identical to the disk 38 of the first embodiment except that instead of utilizing a plurality of radially outwardly directed, circumferentially spaced teeth 42, the disk 38a includes a plurality of equally circumferentially spaced apertures or windows 76. Likewise, the circumferential portion of the disk 40a includes a corresponding plurality of identically arranged windows 76 which are precisely aligned with the windows 76 of the disk 38a in a no load or no torque state.

The embodiment of FIGS. 5-8 utilizes a single optical sensor head 46a which straddles the circumferential portions of the disks 38a and 40a. To facilitate this mounting arrangement the circumferential portion of the disk 40a is axially offset toward the disk 38a, being thereafter radially outwardly directed for location in close proximity to the flat disk 38a. This is best seen in FIG. 5.

The optical sensor head 46a comprises a conventional light emitting diode (LED) 78 located outside the disk 38a, and a sensor 80 located on the outside of the disk 40a in axial alignment with the LED 78.

In the no load or no torque state of the disks 38a and 40a the windows 76 of the disks are precisely aligned and the light path is through the open windows. In this condition the disks are rotating in unison past the fixed sensor head 46a. This results in a series of output signals or pulses having the width and character illustrated in FIG. 7A.

As was the case in the first embodiment, the sensor head monitors the arrival time of each window of one of the disks to generate signals which enable the processing and display module 48 to calculate the rotational speed or RPM of the outer hub 22 on the associated bicycle wheel.

Upon the application of torque to the inner hub 10, which is transmitted to the outer hub 22 by the torsion rods 30, the windows 76 of the disks 38a and 40a become misaligned or circumferentially displaced relative to one another. The sensor head 46a detects partial blockage of the window of one disk by the web located between the windows of the adjacent disk. The diminished light level produces a series of narrower width output pulses, as illustrated in FIG. 7B.

The width of the pulse is indicative of the percentage of time that the sensor head 46a is in a logic high state. Thus, in FIG. 7A, the output is in the high logic state approximately 50% of the time, showing that the windows 76 are aligned and that no torque is being applied to the inner hub 10. When torque is applied, as seen in FIG. 7B, the duration of the diminished high logic state signal, expressed as a percentage of the period of the total output signal, that is the time from the beginning of one high logic state signal to the beginning of the next high logic state signal, is proportional to the torque applied to the hub 10.

An advantage of the second embodiment is that only a single sensor head 46a is required, rendering the system simpler and more rugged than the arrangement of FIGS. 1-3.

Referring to FIG. 6 and the schematic diagram of the electrical circuit illustrated for the sensor the LED 78 has its input anode connected to a positive voltage supply 82 through a series resistor 84, and the cathode of the LED is connected to ground. The collector of the transistor or sensor 80 is also connected to the voltage supply 82, and its emitter is connected to ground through a series resistor 86. The emitter of the sensor 80 is also connected to the input 88 of the processing and display module 48. As is well known, the LED 78 is a rectifying semiconductor device which converts electric energy into electromagnetic radiation sensed by the sensor 80 to derive the desired output signal for coupling to the input 88 of the module 48.

In operation, the rider power output is transmitted from the pedal crank and the bicycle chain to the freewheel gear cluster 36. This rotates the inner hub 10, and this rotational torque is transmitted to the outer hub 22 by means of the bending movement of the torsion rods 30, which act in a manner analogous to springs. The torsion rods have sufficient length that they can flex to a predetermined degree, the amount of flexure being limited by the length of the arcuate slots provided in the disk 40 and spoke flange 24. The slots act as stops to prevent extreme or overload flexure of the rods, and thus control and limit the relative movement between the hubs. The relative angular movement is constrained to some predetermined value, such as in the order of 10-15 degrees of angular movement.

Figure 4:
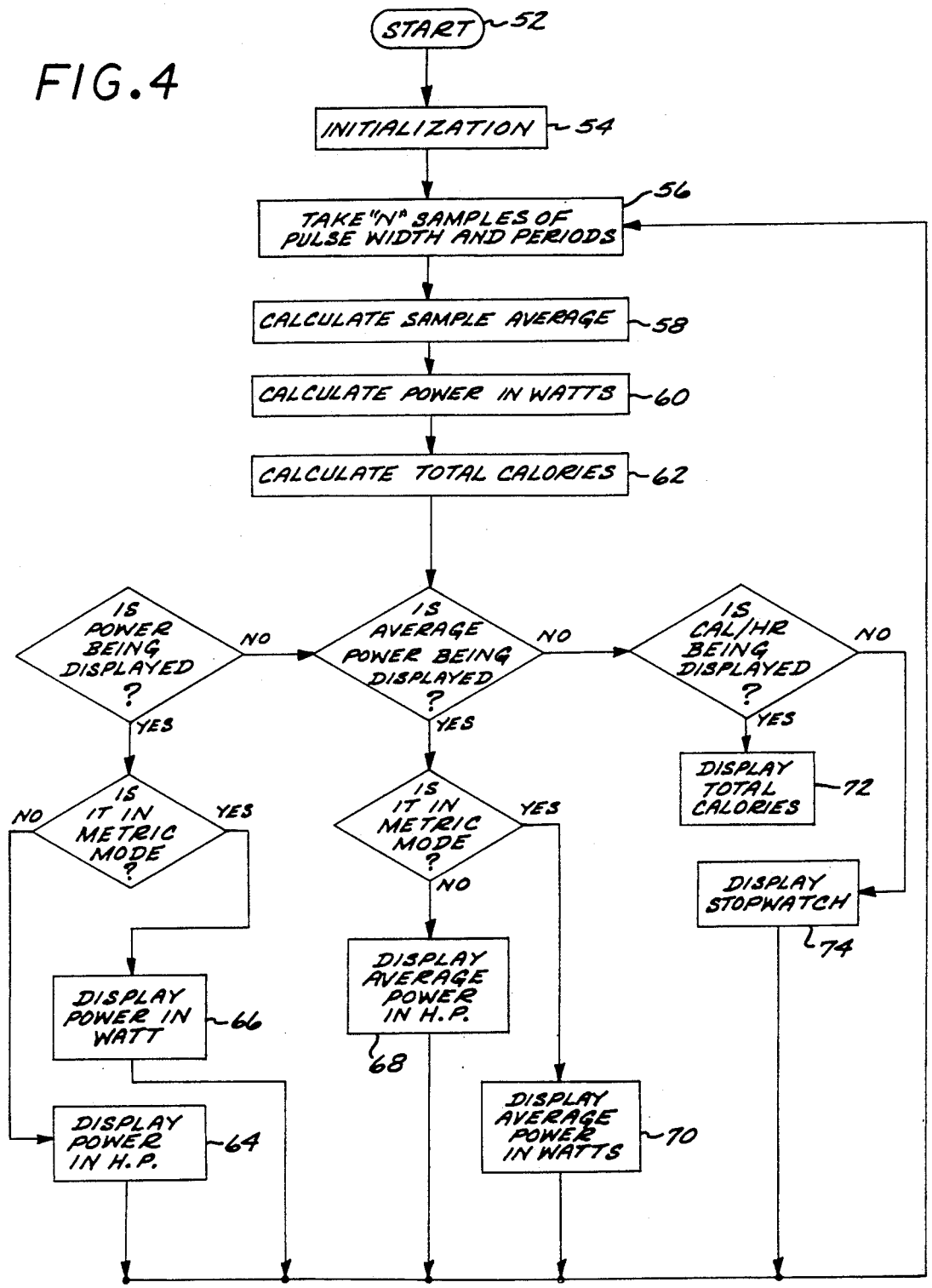
FIG. 4 is a flow chart showing the operation of the bicycle power meter.

FIG. 4 is an exemplary showing of a flow chart showing the manner in which the signals resulting from the rotation of the disk 40 (40a) and the angular displacement between the disks 38 and 40 (38a and 40a) are utilized to generate a display on the readout 50. Thus, from a start block 52 and an initialization block 54, flow is to a function chart 56. At this stage a particular number of samples are taken of the signals from the sensor head 46 (46a) which are indicative of the rate of rotation of the outer hub disk 40, and the relative angular displacement between the disks 38 and 40. The flow is then to a function chart 58 to derive an average sample, following which the flow is to a function chart 60 for calculating the power in watts and to a function chart 62 for calculating the power in calories.

The flow chart then proceeds to a number of decision blocks whose labels are generally self-explanatory. These control whether the display at the readout 50 is in horsepower, as at 64, in watts, as at 66, in average horsepower, as at 68, in average watts, as at 70, in total calories, as at 72, and a stopwatch display, as at 74.

From the foregoing it will be apparent that the present bicycle power meter can be easily substituted for the standard hub assembly of a conventional chain driven bicycle. It is important to note that there is no contact between the sensor head 46 (46a) and the respective hub disks 38 and 40 (38a and 40a). Consequently, there is no power absorbed by the bicycle power meter that would affect the efficiency of the power output of the rider. The meter is adapted to calculate and display various values of interest, including horsepower in either watts or calories, average power in either watts or horsepower, total calories, elapsed time, and also power output efficiency, which is a correlation of horsepower with bicycle speed. Further, the torsion means is expected to even out the application of torque to the outer hub, despite the extremes of power application by the rider by reason of the different locations of the pedal crank arm throughout a cycle of rotation.

Various modifications and changes may be made with regard to the foregoing detailed description without departing from the spirit of the invention.

What is claimed is:

1. A bicycle power meter comprising:
   an axle having an axis and adapted to be fixed to a bicycle frame;
   a first hub carried by the axle for rotation about the axis;
   a second hub carried by the first hub and adapted to mount a bicycle wheel;
   torsion means connected between the first and second hubs and twistable in proportion to the applied torque;
   drive means coupled to the first hub for applying a driving torque to the first hub to thereby impart a change in the angular position of the first hub relative to the second hub;
   sensor means for detecting the change, and also for detecting the rate of rotation of the second hub; and
   means coupled to the sensor means for calculating the power output of the bicycle rider as a function of the change in the angular position and the rate of rotation.

2. A bicycle power meter according to claim 1 and further comprising first position means coupled to the first hub for rotation therewith; second position means coupled to the second hub for rotation therewith; and wherein the sensor means cooperates with the first and second position means to detect any change in their relative angular displacement.

3. A bicycle power meter according to claim 2 wherein the first and second position means comprises first and second disks having circumferentially located first and second reference areas, respectively, and wherein the sensor means detects the rate of circumferential travel and the relative angular displacement between the first and second reference areas.

4. A bicycle power meter according to claim 3 wherein the first and second reference areas each comprise a plurality of equally circumferentially spaced teeth defined by slots in the disk, and wherein the sensor means detects the rate of rotation by sensing the rate of tooth movement past the sensor means.

5. A bicycle power meter according to claim 4 and further comprising display means for displaying the calculated power.

6. A bicycle power meter comprising:
   an axle having an axis and adapted to be fixed to a bicycle frame;
   an inner hub carried by the axle for rotation about the axis;
   an inner hub disk coupled to and rotatable with the inner hub;
   an outer hub sleeved over the inner hub and adapted to mount a bicycle wheel;
   an outer hub disk coupled to and rotatable with the outer hub;
   torsion means connected between the inner and outer hubs and twistable in proportion to rider applied torque;
   drive means coupled to the inner hub for applying a driving torque to the inner hub to thereby impart a change in the angular position of the inner hub disk relative to the outer hub disk;
   sensor means for detecting the change, and also for detecting the rate of rotation of the outer hub disk; and
   means coupled to the sensor means for calculating the power output of the bicycle rider as a function of the change in the angular position and the rate of rotation.

7. A bicycle power meter according to claim 6 wherein the inner and outer hub disks include first and second reference areas, respectively, and wherein the sensor means detects the rate of circumferential travel and the relative angular displacement between the first and second reference areas.

8. A bicycle power meter according to claim 6 wherein the torsion means comprises a plurality of elongated rods extending between and equally circumferentially spaced around the circumferences of the inner and outer hubs.

9. A bicycle power meter according to claim 8 wherein the drive means comprises a freewheeling gear cluster adapted to be engaged and rotated by a bicycle drive chain.

10. A bicycle power meter comprising:
    an axle having an axis and adapted to be fixed to a bicycle frame;
    a cylindrical inner hub carried by the axle for rotation about the axis, one extremity of the inner hub including a flange having a plurality of seats;
    an inner hub disk secured to the outer face of the inner hub flange;
    a cylindrical outer hub sleeved over and rotatably supported by the inner hub and including opposite first and second end flanges adapted to mount the spokes of a bicycle wheel;

an outer hub disk secured to the outer face of the end flange of the first outer hub, and located adjacent the inner face of the inner hub flange;

a plurality of elongated rods, each carried at one extremity in one of the seats of the inner hub flange and secured at the opposite extremity to the second outer hub end flange such that the rods deflect in proportion to rider applied torque;

drive means including a freewheeling bicycle gear cluster connected to the inner hub for applying a driving torque to the inner hub to thereby impart a change in the angular position of the inner hub disk relative to the outer hub disk;

sensor means for detecting the change, and also for detecting the rate of rotation of the outer hub disk; and means coupled to the sensor means for calculating the power output of the bicycle rider as a function of the change in the angular position and the rate of rotation.

11. A bicycle power meter according to claim 10 wherein the inner and outer hub disks include first and second reference areas, respectively, and wherein the sensor means detects the rate of circumferential travel and the relative angular displacement between the first and second reference area.

12. A bicycle power meter according to claim 10 wherein each of the inner and outer hub disks includes a plurality of equally circumferentially spaced teeth defined by slots in the disk, and wherein the sensor means detects the rate of rotation by sensing the rate of tooth movement past the sensor means.

13. A bicycle power meter according to claim 12 wherein the sensor means comprises magnetic pickup transducers.

14. A bicycle power meter according to claim 10 and further comprising display means for displaying the calculated power output.

15. In combination with a bicycle having hub means comprising a pair of hubs associated with a bicycle wheel, a bicycle power meter comprising:

sensing means associated with the hub means and including torsion means connecting the hubs for sensing torque developed in the hub means, and for sensing the rate of rotation of the bicycle wheel, and further including measurement means sensitive to the amount of deflection of one hub relative the other hub, and further sensitive to the speed of rotation of the hubs, the measurement means comprising a first disk coupled to one hub and having a plurality of circumferentially spaced openings, a second disk coupled to the other hub and having a plurality of circumferentially spaced openings aligned with the openings of the first disk in the absence of applied torque, and detection means mounted in close proximity to the first and second disks for detecting misalignment of the openings in the first and second disks; and means associated with the sensing means for utilizing the sensed torque and rate of rotation to calculate and display power.

16. A bicycle power meter according to claim 15 wherein the detection means comprises an optical sensor.

17. A bicycle power meter according to claim 15 wherein the detection means detects the circumferential displacement of the openings in the first disk relative to the openings in the second disk, and power is calculated as a function of the rate of rotation and the amount of the circumferential displacement.

* * * * *